L. MANCY.
Whiffletree Attachment.
No. 85,462. Patented Dec. 29, 1868.
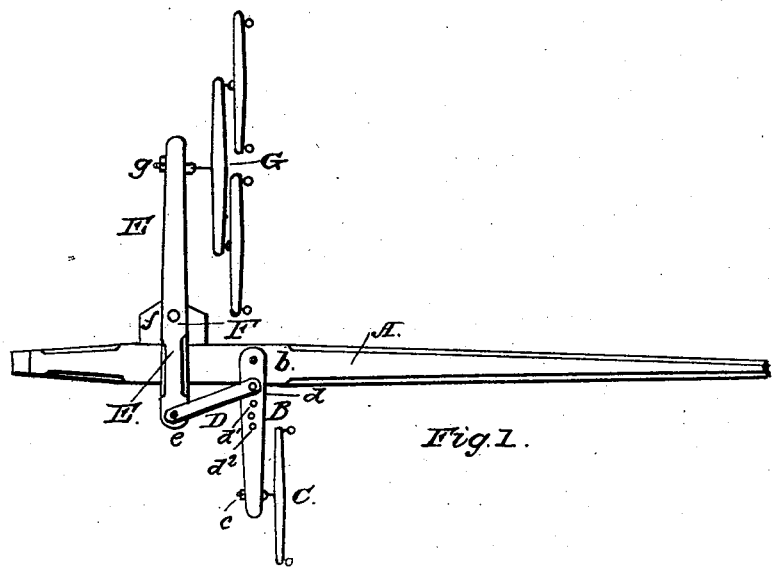
Witnesses
H. Pauli
Robert Burns.
Inventor
L. Mancy
Randolph

LEONARD MANCY, OF ST. MORGAN, ILLINOIS.

Letters Patent No. 85,462, dated December 29, 1868.

IMPROVEMENT IN WHIFFLE-TREE ATTACHMENT.

The Schedule referred to in these Letters Patent and making part of the same.

*To all whom it may concern:*

Be it known that I, LEONARD MANCY, of the town of St. Morgan, in the county of Madison, and State of Illinois, have made certain new and useful Improvements in Whiffle-Tree Attachments; and I do hereby declare that the following is a full and clear description thereof, reference being had to the accompanying drawings, and to the letters of reference marked thereon.

The nature of my invention is in connecting a single-tree with levers, in such wise that the draught of a single horse shall counterbalance the action of draught of two or more horses upon the double or triple-tree attachments, whilst the draught of all animals is utilized for propulsion.

To enable those skilled herein to make and use my said invention, I will now fully describe the same, referring herein to the accompanying drawings, of which—

Figure 1 is a plan, and

Figure 2 is a rear-end elevation.

A represents the tongue or shaft of a wagon or other vehicle, such as a gang-plow or harvester, said tongue being attached in the usual manner to the vehicle.

To said tongue I attach, by the pivot-bolt $b$, the single-tree lever B.

This has, near its outer end, the staple-bolt $c$, for the single-tree C.

I arrange, in the end of said lever B, a series of holes, $c^1$ $c^2$ $c^3$, into which said staple-bolts $c$ may be put, in accordance with the strength of the animal and other conditions of draught.

I further arrange, in connection with said lever B, the connecting or link-bar D, which hinges to B by the bolt $d$, there being in B, again, a series of holes, $d^1$ $d^2$, &c., into each of which the bolt $d$ may be entered, in accordance with the conditions of draught.

Said link D connects, by the bolt $e$, with the lever E.

This lever has its fulcrum, F, on a block, $f$, which is firmly secured, by means of bolts, to the tongue A.

At the other end of the lever E is the staple-bolt $g$, for connecting the double-tree G in the usual manner.

A series of holes, $g^1$ $g^2$, &c., in the end of said lever E, permits a change of the point of attachment of the double-tree G.

The action of the said parts is now as follows:

In the usual harvester, for instance, it is necessary to hitch one horse "close in," in order that the machine may run close to the standing grain, and to get the necessary draught a double team is to be attached at the other side of the tongue A.

If, now, one horse is attached at the single-tree C, the draught hereof is, by the lever B and link D, transmitted in increased power upon the end of the lever E, but the double-tree attachment G, for two horses, acts upon said lever, as before stated; hence, owing to the apportionment of arm-lengths of said lever, the draught of one draught animal at C is balanced against the draught of the double team at G. Thus the entire draught-force acts equally to propel the vehicle.

Of course the action of the levers here described is merely intended to keep the single-tree C in its proper position with respect to the double-tree attachment G, thereby enabling all the draught-animals to proceed in line, and equalizing the otherwise disproportionate effects arising from the position of a double team on one side against a single animal on the other side of the tongue.

Now, as the power of draught varies with the animal, it will be seen that by changing the points of attachment of the staple-bolts $c$, and thus changing the leverage of the single-tree C, or by changing the staple-bolt attachment $g$, and thereby changing the leverage of the double team, and lastly, by changing the point of connection of the link D with the lever C, such variation in the action of the draught-forces may be made as will accommodate the various muscular powers of the draught-animals.

Having thus fully described my said invention,

What I claim, is—

1. The combination of the single-tree C, the adjustable staple-bolt $c$, the lever B, adjustable bolt $d$, and link D, the lever E, adjustable staple-bolt $g$, and double-tree G, substantially as set forth.

2. The pivot F on the fulcrum-block $f$, attached at the side of the tongue A, substantially as set forth.

LEONARD MANCY.

Witnesses:
GEO. P. HERTHEL, Jr.,
ROBERT BURNS.